(12) United States Patent
Chadzynski

(10) Patent No.: US 7,661,101 B2
(45) Date of Patent: Feb. 9, 2010

(54) SYNCHRONOUS AND ASYNCHRONOUS COLLABORATION BETWEEN HETEROGENEOUS APPLICATIONS

(75) Inventor: Pawel Z. Chadzynski, Dunstable, MA (US)

(73) Assignee: Parametric Technology Corporation, Needham, MA (US)

(*) Notice: Subject to any disclaimer, the term of this patent is extended or adjusted under 35 U.S.C. 154(b) by 607 days.

(21) Appl. No.: 10/757,975

(22) Filed: Jan. 15, 2004

(65) Prior Publication Data

US 2005/0160396 A1    Jul. 21, 2005

(51) Int. Cl.
G06F 9/44 (2006.01)
(52) U.S. Cl. .................................................. 717/164
(58) Field of Classification Search ......... 717/100–103, 717/120–123, 164; 709/227–229, 205; 719/330; 703/1–4, 6–7; 700/97–98; 705/9; 345/531
See application file for complete search history.

(56) References Cited

U.S. PATENT DOCUMENTS

| | | | |
|---|---|---|---|
| 5,444,616 A | 8/1995 | Nair et al. | |
| 5,551,028 A | 8/1996 | Voll et al. | |
| 5,598,344 A | 1/1997 | Dangelo et al. | |
| 5,634,064 A | 5/1997 | Warnock et al. | |
| 5,652,876 A | 7/1997 | Ashe et al. | |
| 5,666,543 A | 9/1997 | Gartland | |
| 5,796,986 A | 8/1998 | Fuller | |
| 5,812,130 A | 9/1998 | Van Huben et al. | |
| 5,838,906 A | 11/1998 | Doyle et al. | |
| 5,903,902 A | 5/1999 | Orr et al. | |
| 5,909,568 A | 6/1999 | Nason | |
| 5,920,873 A | 7/1999 | Van Huben et al. | |
| 5,983,277 A | 11/1999 | Heile et al. | |
| 5,999,911 A | 12/1999 | Berg et al. | |
| 6,035,297 A | 3/2000 | Van Huben et al. | |
| 6,065,857 A | 5/2000 | Hazama et al. | |
| 6,161,114 A | 12/2000 | King et al. | |
| 6,161,211 A | 12/2000 | Southgate | |
| 6,171,109 B1 | 1/2001 | Ohsuga | |
| 6,216,252 B1 | 4/2001 | Dangelo et al. | |
| 6,298,319 B1 | 10/2001 | Heile et al. | |
| 6,453,356 B1 | 9/2002 | Sheard et al. | |
| 6,567,783 B1 * | 5/2003 | Notani et al. | 705/9 |
| 6,614,430 B1 | 9/2003 | Rappaport | |
| 6,634,008 B1 | 10/2003 | Dole | |
| 6,721,614 B2 | 4/2004 | Duncan et al. | |
| 6,748,419 B2 * | 6/2004 | Grayson et al. | 709/205 |

(Continued)

OTHER PUBLICATIONS

The International Search Report and the Written Opinion of the International Searching Authority mailed May 7, 2007 in PCT International Application No. PCT/US05/00750.

(Continued)

Primary Examiner—Tuan Anh Vu
(74) Attorney, Agent, or Firm—Edwards Angell Palmer & Dodge LLP; Ralph A. Loren; Brian R. Landry

(57) ABSTRACT

A network-based collaboration system and method can be used to create, modify or otherwise manipulate a design using heterogeneous applications on clients connected to a network. The system and method enables design collaboration between the heterogeneous applications each having a different design abstraction and a different local data model by exchanging application states normalized at a design abstraction level recognized by each of the heterogeneous applications.

24 Claims, 6 Drawing Sheets

U.S. PATENT DOCUMENTS

| | | | |
|---|---|---|---|
| 6,928,396 B2 * | 8/2005 | Thackston | 703/1 |
| 6,963,930 B2 | 11/2005 | Halpert et al. | |
| 7,069,192 B1 * | 6/2006 | Freitag | 703/1 |
| 7,103,434 B2 | 9/2006 | Chernyak et al. | |
| 2002/0024517 A1 | 2/2002 | Yamaguchi et al. | |
| 2002/0035451 A1 * | 3/2002 | Rothermel | 703/1 |
| 2002/0067364 A1 * | 6/2002 | Lane et al. | 345/531 |
| 2002/0183957 A1 | 12/2002 | Croix et al. | |
| 2003/0177187 A1 | 9/2003 | Levine et al. | |

OTHER PUBLICATIONS

Andrew S. Tanenbaum & Maarten Van Steen, "Distributed Systems: Principles and Paradigms" 699-735 (2002).

Patrick Th. Eugster et al., "The Many Faces of Publish/Subscribe," 35(2) ACM Computing Surveys 114-31 (Jun. 2003).

Supplementary European Search Report in EP 05 70 5421 dated Jun. 16, 2008.

Marsic, et al, "An Application Framework for Synchronous Collabdration using Java Beans" Proceedings' of the 32nd. Hawaii International Conference on System Sciences, Jan. 8, 1999, pp. 1-10.

Francu, et al, "An Advanced,Communication Toolkit for Implementing.the Broker Pattern". Proceedings of the.19th IEEE International Conference on Distributed Computing Systems -(ICDCS'99), Jun. 5, 1999, pp. 458-467.

Anonymous: "Disciple Mobile Computing and Collaboration" Internet Article, Retrieved from the Internet: URL: http://www.caip.rutgers.edu/discipleh.

Maher, et al, "An Agent Approach to Supporting Collaborative Design in 3D Virtual Worlds" Proceeding of ECAADE'2003, Sep. 20, 2003, pp. 1-8.

Anonymous: "2003 Publications" [Online] Homepage of Mary Lou Maher, Retrieved from the Internet: URL: http://web.arch.usyd.edu.au/imary/.

Anonymous: "The MQ Messaging System" Internet Article, [Online] Sep. 30, 2002, pp. 1-26, Campus Information Technologies and Educational Services, University of Illinois at Urbana-Champaign, Retrieved from the Internet: URL: http://docsun.cites.uluc.edu/sun_docsi.

Patrick Chan, "The Java Developers Almanac 1.4: Examples and Quick Reference," vol. 1 (2002).

Michael Halvorson, "Microsoft Visual Basic 6.0 Professional: Step by Step," (1998).

Steven M. Kaplan, "Wiley Electrical and Electronics Engineering Dictionary," 84 (2004).

Andrew S. Tanenbaum, "Modern Operating Systems," 294-297 (2d ed. 2001).

Baomin Xu, "A General Framework for Constructing Application Cooperating System in Windows Environment," 28(2) Software Engineering Notes 1-6 (Mar. 2003).

Samuel Pekkola, "Critical Approach to 3D Virtual Realities for Group Work," NordiCHI 129-138 (Oct. 19-23, 2002).

Thomas P. Moran, "Design and Technology for Collaborage: Collaborative Collages of Information on Physical Walls," 1(1) CHI Letters 197-206 (1999).

Wen Li, "Collaboration Transparency in the Disciple Framework," Group 326-335 (1999).

Federico Bergenti, "A Collaborative Platform for Fixed and Mobile Networks," 45(11) Communications of the ACM 39-44 (Nov. 2002).

James "Bo" Begole, "Transparent Sharing of JAVA Applets: A Replicated Approach," UIST 55-64 (1997).

Simon Lok et al., "A Graphical User Interface Toolkit Approach to Thin-Client Computing," WWW2002 (2002).

* cited by examiner

```xml
<InterComm_Macro Application_Name="InterComm" Application_Rev="5.1e25"
      ICM_Bookmark_Rev="1.3" Writer_Rev="1.2.0" Date="January 14,2004">
  <Macro_Define Name="PCBdsn#95;pzc#95;040114#95;235823"
      Initial_State="yes" Type="pcb">
    <Do>
      <Units Reference="inch" Precision="0">
        <Units_Custom Name="mil" Factor="0.001000"/>
      </Units>
      <Visibility/>
      <Visibility Mode="on" Layer_Name="Global" Layer_Indexes="1"
          Sublayer_Name="Board outline" Sublayer_Indexes="2"/>
      <Visibility Mode="on" Layer_Name="TOP" Layer_Indexes="4"
          Sublayer_Name="Pin pads" Sublayer_Indexes="5"/>
      <Annotations Visibility="off" Clear="off"/>
      <Window>
            <Window_Areal Left_X="1882.772705" Top_Y="3883.727295"
                Right_X="2809.152832" Bottom_Y="3309.136719"
                User_Unit="true"/>
      </Window>
      <Board_Orientation Flip="no" Rotation="0" Increment="90"/>
      <Highlight/>
      <Highlight Names="U1502.13" Category="pin" Highlight="on"
          Zoom="off" Center="off" Query="off"/>
      <Highlight Names="U1502.12" Category="pin" Highlight="on"
          Zoom="off" Center="off" Query="off"/>
      <Highlight Names="U1502.14" Category="pin" Highlight="on"
          Zoom="off" Center="off" Query="off"/>
      <Color Layer_Indexes="1" Sublayer_Indexes="2" Default="no"
          Red="ff" Green="ff" Blue="0"/>
      <Color Layer_Indexes="1" Sublayer_Indexes="3" Default="no"
          Red="ff" Green="ff" Blue="0"/>
      <Color Layer_Indexes="1" Sublayer_Indexes="6" Default="no"
          Red="80" Green="80" Blue="80"/>
      <Color Layer_Indexes="1" Sublayer_Indexes="7" Default="no"
          Red="ff" Green="0" Blue="ff"/>
      <Color Layer_Indexes="1" Sublayer_Indexes="8" Default="no"
          Red="80" Green="80" Blue="ff"/>
      <Color Layer_Indexes="1" Sublayer_Indexes="9" Default="no"
          Red="ff" Green="ff" Blue="80"/>
      <Color Layer_Indexes="1" Sublayer_Indexes="10" Default="no"
          Red="80" Green="c0" Blue="c0"/>
      <Color Layer_Indexes="1" Sublayer_Indexes="11" Default="no"
          Red="ff" Green="c0" Blue="c0"/>
      <Color_Highlight Red="ff" Green="ff" Blue="ff"/>
      <Color_Background Red="0" Green="0" Blue="0"/>
    </Do>
  </Macro_Define>
</InterComm_Macro>
```

FIG.6

SYNCHRONOUS AND ASYNCHRONOUS COLLABORATION BETWEEN HETEROGENEOUS APPLICATIONS

TECHNICAL FIELD

The present invention relates to collaboration between applications and more particularly, to software that provides synchronous and asynchronous collaboration between heterogeneous design applications.

BACKGROUND INFORMATION

Collaboration on a common project by people at different locations has become more common. Indeed, companies may have engineers from many different geographical locations working as a team on a common project. To collaborate on the project, the individual members of the engineering team either travel to a common location or use computer networks. Historically, when using computer networks to collaborate, a single engineer will take the lead and transmit drawing images showing potential changes to the product design to other members of the team. The computer-network system of collaboration can be more efficient than attempting to bring all of the members of the collaboration group into a single conference room to crowd around a table and review a single design drawing as the group leader makes changes.

In certain collaborative projects, such as the design and manufacture of electro-mechanical products, all team members are generally working towards design and manufacture of the same product. However, the needs of their specific domain expertise may require each to use a different design abstraction (e.g., schematic for functionality, floor planner for constraint tradeoffs, layout for placement and routing, mechanical for design enclosures, DFM for conformance with manufacturing processes, etc.). This creates unique challenges when collaborating over a network because each participating domain expert may potentially be using a different application during a collaboration session and yet all want to simultaneously reference the same design.

Referring to FIG. 1, one example of a current approach to network-based design collaboration is shown. According to this approach, a single design application 10 is located on either a server 12 or a client 14 connected to a network 16. In the server-based implementation, the application 10 is hosted on a server 12 and all other participating clients 14 use the network (e.g., the Internet) to connect to it via a session hosted on the same server. One example of this approach has been implemented by Citrix Systems, Inc. In the client-based implementation, the application 10 is hosted on one of the clients 14 and all of the other participating clients 14 use the network 16 to connect to it via a session hosted on a remote server 12. One example of this approach has been implemented by WebEx Systems, Inc.

The server 12 includes a session manager 20 for managing connectivity and data traffic including transfer of the application images between the clients 14. Each of the clients 14 includes a session client process 22 that synchronizes user interaction and image display between the local client and the session. During a collaboration session, there is a flow of messages 24 for session controls that include the application images. Regardless of where the controlling design application 10 is hosted, each client 14 is allowed to interact with the application 10 in a way that enables other participants to see what is being done.

The above approach to network-based design collaboration has limitations. Because each user shares a single image from a single application, this approach is limited when the design activities involve simultaneous usage of different or heterogeneous design applications (e.g., different CAD tools). The sharing of a single application also presents licensing issues. The user license for the application may not allow multiple users of the application over the network, resulting in potential licensing violations. Also, the transmission of the actual images over the network presents security concerns. The unauthorized interception of messages exchanged during a collaborative session may result in the disclosure of confidential design drawings.

Accordingly, there is a need for a collaboration system and method that allows heterogeneous applications (e.g., different CAD tools) to be used and that does not require transmission of the design images.

SUMMARY

In accordance with one aspect of the present invention, a computerized system and method is provided for synchronously collaborating over a network to manipulate a design using a plurality of heterogeneous user applications running concurrently on respective clients connected to the network. The system and method involve connecting a session client process to a session manager over the network to participate in a collaborative session and sharing session control messages with other session client processes connected to the session manager. Design data representing the design is loaded into a local application running on the client and at least one application state file is created representing at least one application state of the local application based on manipulation of the design using the local application. The application state file is dynamically communicated from the session client process to the other session client processes via the session manager. Application state files created by other local applications and communicated from the other session clients via the session manager are loaded into the local application.

According to another aspect of the present invention, a computerized system and method is provided that can be used for asynchronous collaboration. This system and method involves loading design data into a local application on a computer and manipulating the design using the local application. One or more application state files are created representing an application state of the local application based on at least one manipulation of the design using the local application. The application state file(s) are saved in a journal file and the journal file is transmitted to another computer at some later time such that the application state file(s) can be loaded on the other computer at some later time and the manipulations can be reviewed using another heterogeneous application running on the other computer.

According to another aspect of the present invention, a computerized system and method is provided that can be used for dynamically collaborating between at least two heterogeneous applications running concurrently on a single client. This system and method involves loading design data into each of the applications. Every time a design object is manipulated (e.g., an object is highlighted) in one of the applications, an application state file is created that reflects the name of the object highlighted and the other application is dynamically notified of the application state file using a local operating system inter-process messaging. The other application can then read this application state file and similarly manipulates a corresponding design object in its database based on the application state file. This process is preferably bi-directional.

BRIEF DESCRIPTION OF THE DRAWINGS

These and other features and advantages of the present invention will be better understood by reading the following detailed description, taken together with the drawings wherein:

FIG. 6 illustrates one example of an application state file.

DETAILED DESCRIPTION OF THE PREFERRED EMBODIMENTS

Figure 1:
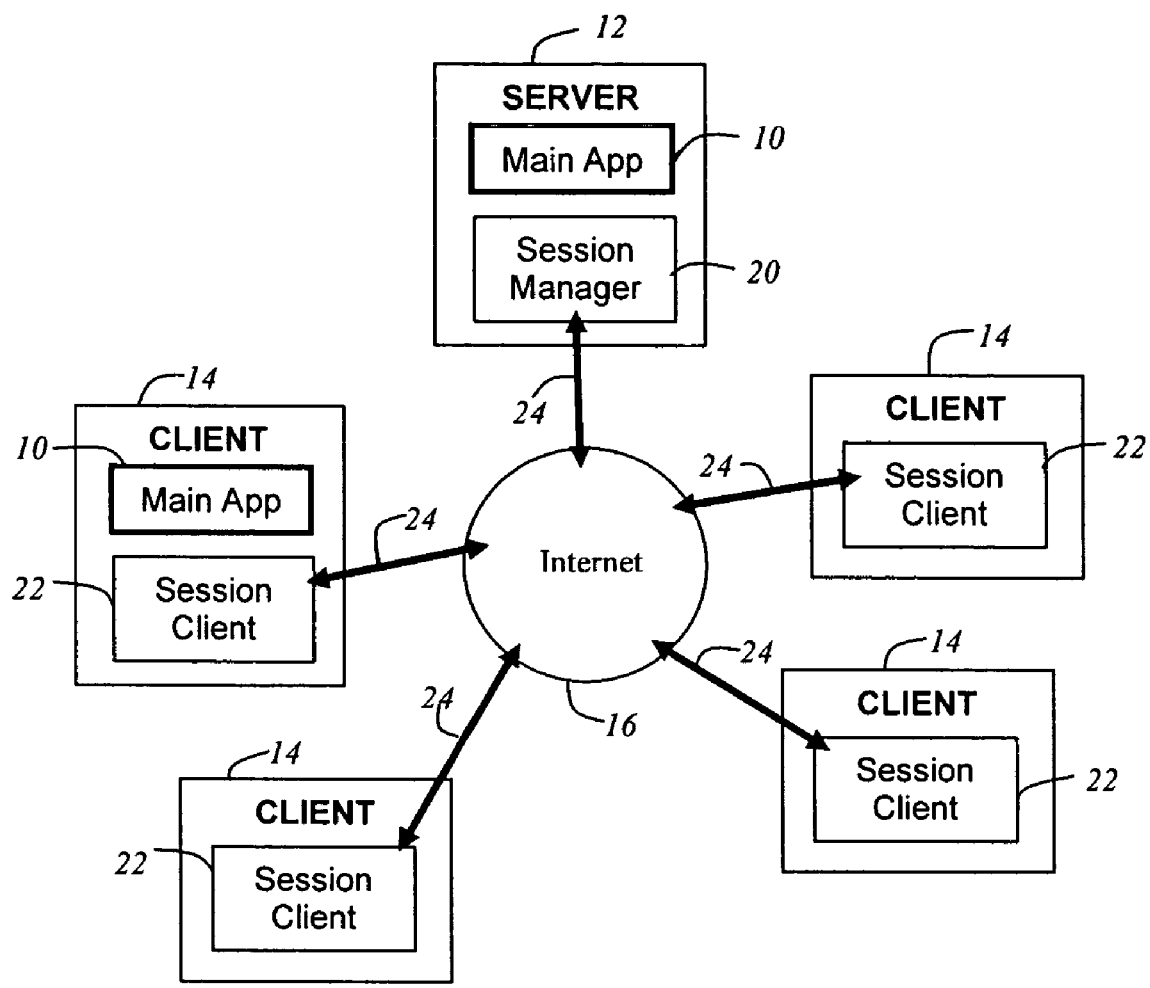
FIG. 1 is a functional block diagram of an existing network-based collaboration system.
Figure 2:
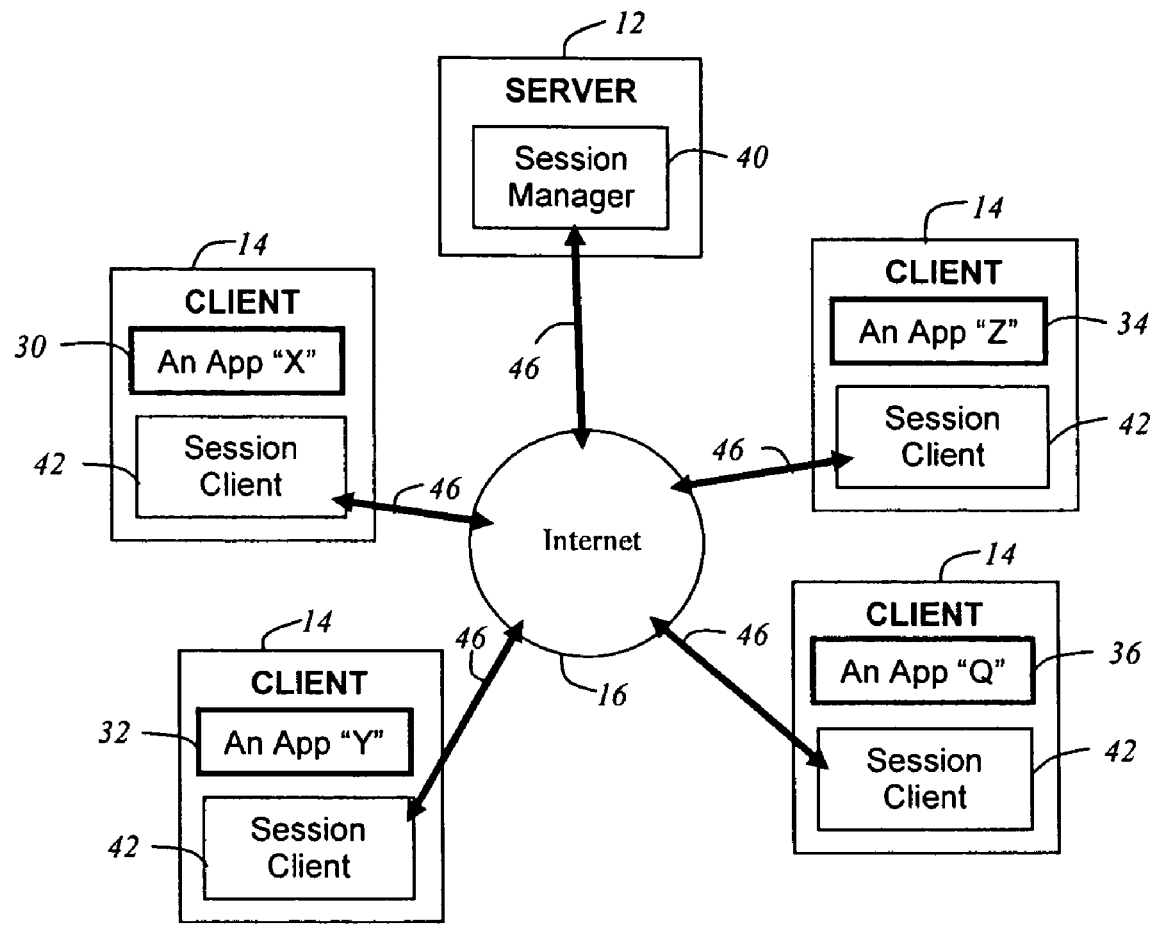
FIG. 2 is a functional block diagram of a network-based collaboration system, according to one embodiment of the present invention.

Referring to FIG. 2, a network-based synchronous collaboration system and method is used to collaborate on a design using heterogeneous applications 30-36. The applications 30-36 are heterogeneous in that they use different design abstractions and different local data models. Collaboration in the context of this invention means synchronous or asynchronous sharing of design data among one or more computers for the purpose of creating, modifying, annotating, reviewing, documenting or otherwise manipulating the design data. The system and method enables design collaboration between the heterogeneous applications 30-36 by exchanging application states normalized at a design abstraction level recognized by each of the heterogeneous applications 30-36. Thus, the heterogeneous applications 30-36 can be used to collaborate on a design without having to transmit the design images between the applications. Although the network-based synchronous collaboration system and method is especially suited for use in the context of computer-aided design (CAD) applications employed in the design of electronic and mechanical assemblies, the system and method can be used in any collaborative environment and with any type of applications.

According to the network-based synchronous collaboration system and method, a server 12 and any number of clients 14 are connected to a network 16. A session manager 40 is located on the server 12 and session client processes 42 are located on each of the clients 14 and integrated with the respective local user applications 30-36. The session manager 40 manages connectivity and data traffic 46 between the session client processes 42. The data traffic 46 includes session messages for session control, i.e., normalized instructions for the session client processes 42. The data traffic 46 also includes the application states that convey the state of the individual applications 30-36, which are then interpreted by each application 30-36 in its own context. The data traffic 46 preferably does not contain any images and the transmission of images is not required for the collaboration, although the present invention does not necessarily preclude the transmission of images together with the application states.

Although the exemplary embodiment is an internet-based synchronous collaboration system and method, the present invention can also be implemented on other types of networks including, but not limited to, intranets or extranets. In another embodiment, the invention can be implemented on a stand-alone computer, for example, in an asynchronous mode.

The application states are preferably encoded with a set of normalized XML structures designed for use by different applications via built-in interpreters. Instead of encoding entire images, these XML structures refer to states and database objects on an abstraction level common to the involved applications 30-36. In other words, the applications 30-36 communicate their states with respect to their databases, instead of communicating the images. In CAD applications, for example, the application states can include zoom, pan, units, visibility, color, highlights, and the like, the design objects can include layers, classes, components, pins, nets, test points, object attributes and properties, and the like and the annotations can include text, drafting, URL hyper links, and the like. One example of an application state file in XML format is shown in FIG. 6.

The ability to convey application states via a normalized set of XML messages allows sharing of interactive events, such as the highlighting of an object across all applications capable of referencing such object. Because the heterogeneous applications 30-36 can interpret the application states, the users are not limited to using a single application sharing the same image during a collaborative session. Security is enhanced when the actual images are not exchanged during the live on-line collaboration, thereby avoiding the need for encryption to protect unauthorized interception of images.

User applications running locally on a client also may avoid the licensing issues involved with multiple users simultaneously interacting with a single application over a network. Licensing violations are less likely to occur when each user is using a local application for which the user is licensed. Also, an architecture of distributed heterogeneous applications running on separate clients improves interactive performance of the collaborative sessions by decreasing the processing load on the server. Interactive performance is also improved by eliminating the need to transfer graphic images.

These XML structures are preferably defined and communicated through external files, which are not dependent on the control and flow of the collaborative session. The function of the session manager 40 is preferably limited to managing client connectivity and exchanging the application states between clients 14. This separation of collaborative session controls from details of application states provides flexibility. For example, the user can select or upgrade collaborative services (i.e., providers of the server-based session manager 40) and the change of service provider is less likely to limit collaborative choices in specific design domains.

Figure 3:
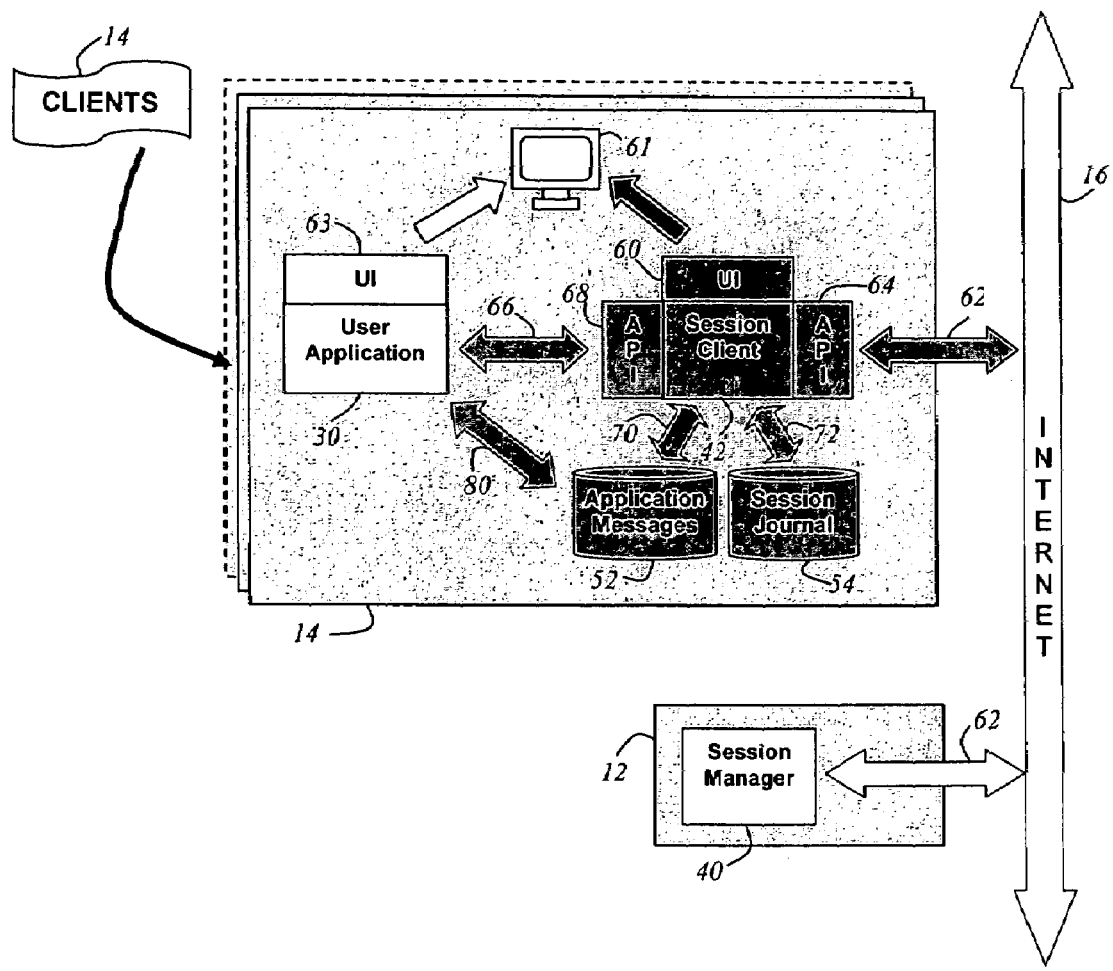
FIG. 3 is a functional block diagram of the client and server in a network-based collaboration system, according to one embodiment of the present invention.

Referring to FIG. 3, one embodiment of the network-based synchronous collaboration system is described in greater detail. Each client 14 includes a user application 30 and a session client process 42 for synchronizing interaction between the user application 30 and the collaborative session. Each client 14 replicates generally the same integration with its session client 42, but the application 30 can be different from applications on other clients 14. An application state file 52 created on the client 14 captures the application states of the user application 30. The application state file 52 is preferably in XML format and a domain specific XML dictionary (i.e., a DTD) defines XML constructs, keywords and tags used by the application state file 52 for a particular design abstraction. For example, for printed circuit board designs, an application state file for a schematic abstraction is based on a different XML dictionary than an application state file for a physical layout abstraction. Similarly IC designs use different dictionaries from printed circuit board designs. The user application 30 preferably includes a reader/writer 80 for reading from and writing to the application state file 52. One example of an application state file 52 is shown in FIG. 6. A session journal file 54 stored on the client 14 maintains a log of the session activities.

The session client 42 includes a user interface 60 for user interaction with the user. The client 14 can display the user interface 60 on the same screen 61 as the user interface 63 for the application 30. The user interface 60 preferably provides a consistent look and feel across multiple clients 14, operating system platforms and user applications 30.

The user interface 60 allows the user to control and monitor various functions and interactions of the session client process 42 and the local user application 30. The user interface 60 can be used to initiate and terminate the local user application 30 and to locate and load appropriate design files into the user application 30. The user interface 60 can also be used to schedule new sessions and to log in to and out of scheduled sessions via the session manager 40. The user interface 60 displays all communication activity with the user application 30 and with the session manager 40. The user interface 60 can be used to provide chat style textual communications among the active session participants in a chat line like form. The user interface 60 allows the user to control sending and receiving the application state file(s) 52 to and from other session participants. The user interface 60 also allows the user to control initiating the reading and writing of the application state file 52 by the user application 50. The user interface 60 further allows the user to control writing to the local session journal file 54 and initiating play-back of the session journal file 54.

The client session 42 includes external controls and application programming interfaces (APIs) 64, 68 for synchronizing interactions with the session manager 40 and the local user application 30. Session synchronization between the session client 42 and the session manager 40 is provided through session controls 62 passed via the appropriate industry standard Internet communication channels. The session controls 62 are defined and enforced by the session client 42 and they instruct the session clients 42 and the session manager 40 as to what to do next with respect to collaborative activities. The session controls 62 also transport the application state file(s) 52 to other session clients 42 that participate in the collaborative session. Session synchronization between the session client 42 and the user application 30 is provided through a set of application controls 66 passed via the related application programming interface (API) 68. The application controls 66 are defined and enforced by the session client 42 and they instruct the session client 42 and the application 30 as to what to do next with respect to the collaborative activities. Although the technical details of such controls depend on the operating system, two examples are OLE Automation in the Microsoft Windows operating system and sockets in the Unix operating system.

The session client 42 also includes internal controls for handling interaction with the application state file 52 and the journal file 54. Application state file controls 70 transport one or more application state file(s) 52 to and from the session manager 40. Session journal controls 72 record session activities in the session journal file 54 and communicate the content of the session journal file 54 to the user application 30.

The user application 30 can be based on an existing design application, which has been designed or extended to properly read, write and interpret the XML structures and to integrate with the session client 42 through the controls 66 and API 68. One example of an application that can be used is the application (and its API) available under the name InterComm from OHIO Design Automation Inc., which is described in co-pending patent application Ser. No. 09/885,834 incorporated herein by reference. Other examples include the applications available under the names Allegro and Concept from Cadence Design Systems Inc. and the SKILL API used with these applications.

The session manager 40 can be based on an existing session manager, which has been designed to handle session controls 62 and to integrate with the session clients 42. One example is the session manager used in the Internet communications services provided by WebEx Communications, Inc.

Figure 4:
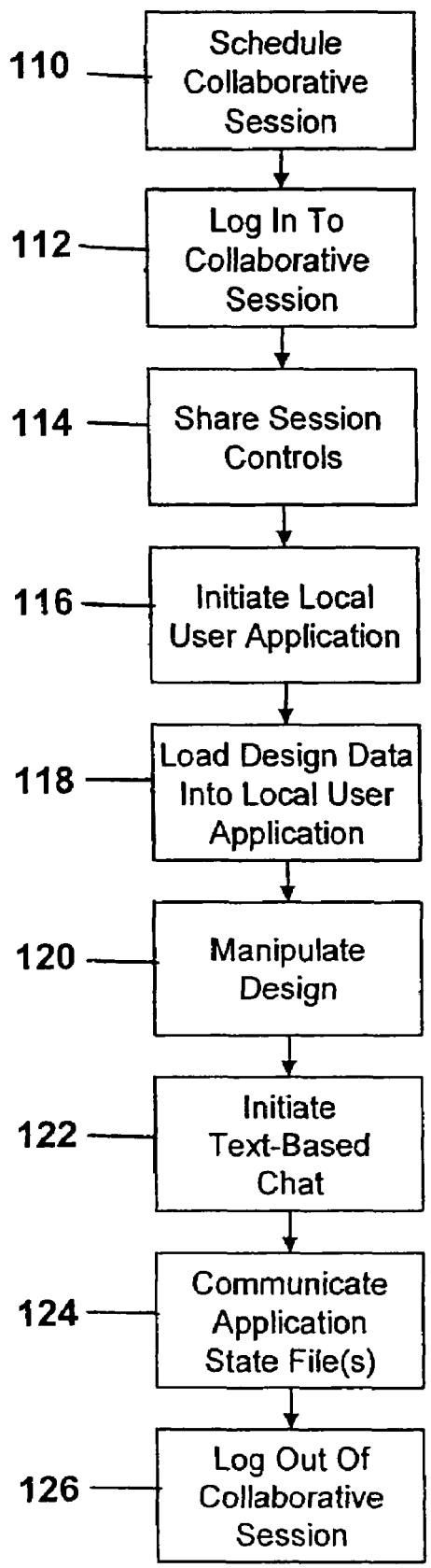
FIG. 4 is a flow chart illustrating a synchronous collaboration method, according to one embodiment of the present invention.

Referring to FIG. 4, one method of synchronous collaboration is described. A user can schedule a new collaborative session using the services of the session manager 40, step 110. The user can log in to the session manager 40 with a username/password, schedule a new collaborative session, and invite participants. The user can also communicate to the session participants the process for obtaining the appropriate design databases. For example, each session participant may load its own version of the design database compatible with the local application using local PLM procedures. The scheduling step can be performed using the session client 42 or using an Internet browser, depending upon the implementation. Access to the services of the session manager 40 can also require a subscription based on fees.

On the scheduled day/time, the user and other invited users log into the session manager 40 using the user interface 60 of the client session 42, step 112. Session login may require the user to enter a previously defined username and password.

Once the session manager 40 determines that the collaborative session was initiated and that the appropriate parties have joined, it starts sharing session controls (including information as to the origin of the controls) received from one session client with all participating session clients, step 114. All local session client controls exchanged with the user application 30 and/or the session manager 40 are preferably recorded in the local session journal 54 of each client 14.

The user initiates the local application 30, step 116, and then locates and loads the related design data into the user application, step 118. Depending on the details of the local integration between the session client 42 and the user application 30, these steps can be initiated either through the session client or through the user application 30. Also, these steps can be performed by the local application 30 either before or after logging into a collaborative session. The local application 30 can then be used to manipulate the design, step 120.

According to the user session priority and privileges enforced by the session manager 40, one or more of the users can use the session client 42 user interface 60 to start a chat line like text-based conversation with other participants, step 122. This text is sent to the session manager 40, which in turn distributes it to all participating session clients 42 for display through the respective user interfaces 60 along with the information that identifies the originator. All chat line messages sent and received are preferably recorded in the local session journal 54 of each client 14.

According to the user session priority and privileges enforced by the session manager 40, one or more of the users can use the session client 42 user interface 60 to communicate application states to the others, step 124. In particular, the user application 30 is instructed by the session client 42 to create an application state file 52 (e.g., using XML structures) based on design manipulations, and the user application 30 informs the session client 42 that the application state file 52 was generated. The session client 42 sends the application state file 52 with the appropriate session controls to the session manager 40. The session manager 40 distributes the received application state file 52 with the appropriate session controls to all active participants. All application states are also preferably recorded in the local session journal 54 of each client 14.

When an application state file 52 is received, session clients 42 send a session control 66 to the local user application 30 indicating that a new application state file is available. The local user application 30 loads the newly arrived application state file 52 using parser 80 to reflect a new state of the display. Using local session client UI 60, the user can control when the synchronization actually occurs and how long it is in effect, without affecting active connectivity with the collaborative session. While the session client 42 continuously buffers application states files 52 from the other participants, for example, users may refuse or delay instantiation of the newly arrived application state file 52 in their user application 30. This on-demand synchronization allows the user to work on something independently with the user application 30 while the collaboration continues and then catch up later without loosing the details of the concurrent collaborative exchange.

The collaboration continues until all participating users log out of the session using their local session clients 42, step 126. The session clients 42 can reload the local session journal files 54 anytime after the session has been terminated in order to replay the entire collaborative session in an asynchronous mode.

Users also have an option to use the session client 42 to create a session journal 54 file without ever logging into a collaborative session. This is a form of an asynchronous collaboration. Journal files 54 can also be generated entirely outside of the session client 42 through any appropriate means and then shared with session clients 42 in an asynchronous mode.

Figure 5:
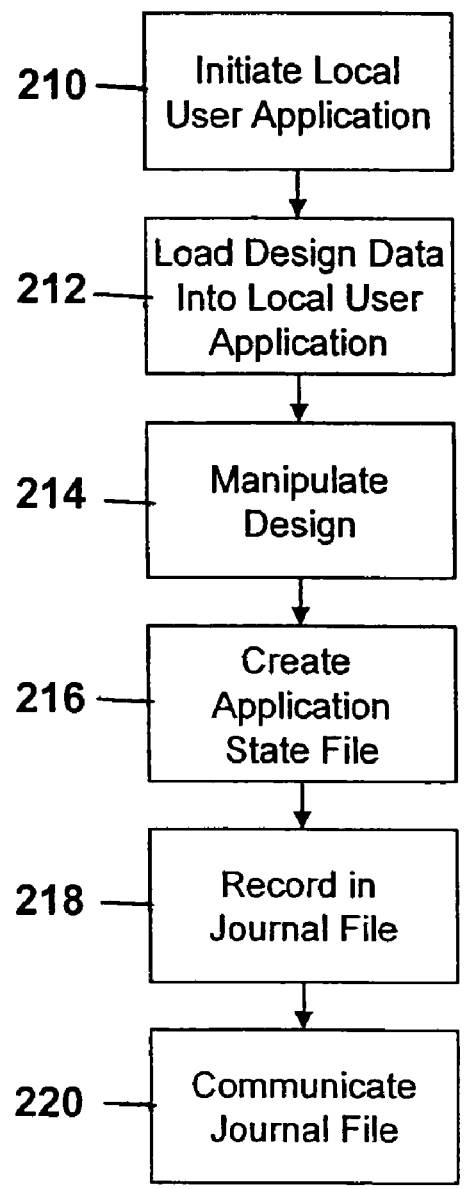
FIG. 5 is a flow chart illustrating an asynchronous collaboration method, according to another embodiment of the present invention.

Referring to FIG. 5, one method of asynchronously collaborating is described in greater detail. The method is similar to the synchronous collaboration method described above, without the steps of scheduling and logging in to a collaborative session and sharing session controls. The user initiates the local user application 30, step 210, and the design data is loaded into the local user application, step 212. The design is manipulated using the application, step 214, and the application state file is created based on the design manipulations, step 216. The application states files 52 (e.g., XML messages) are recorded in the journal file 54, step 218, which can later be communicated with another user, step 220, and loaded to replay the asynchronous collaboration session without being connected to the server. This allows the user to review the design independently of the other collaborating users. The asynchronous mode can also be used when a synchronous collaboration cannot be scheduled (e.g., due to time zone conflicts). Asynchronous collaboration can also be used to author instructions such as training, rework or Engineering Change Orders (ECO) for electronic or mechanical assemblies.

According to another method, collaboration is provided between two heterogeneous applications running on the same client (not shown). This involves loading appropriate design data into each of the two user applications such as Allegro available from Cadence Design Systems Inc. for PCB designs and DX Designer available from Mentor Graphics Corp. for schematic designs while both applications are running concurrently on the same client. In one example of this method, a design object is modified by highlighting the design object using one of the user applications. Every time an object is highlighted in one of the user applications, an application state file is created that reflects the name of the object highlighted and the other application is notified of this fact using a local operating system inter-process messaging, e.g., OLE Automation on Microsoft Windows. The other user application then reads this application state file and highlights the corresponding object in its database. This process is preferably bi-directional between the user applications.

Embodiments can be implemented as a computer program product for use with a computer system including, but not limited to, a PC or a mobile device. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A computerized method for synchronization of a plurality of heterogeneous user applications running on respective clients collaborating over a network via a session manager to manipulate a design manipulated by a plurality of users representing electrical or mechanical assemblies, said method comprising the steps of:

connecting a session client process to a session manager over the network to participate in a collaborative session;

sharing session control messages with other session client processes connected to said session manager;

loading design data representing said design into a local application running on said client;

creating at least one application state file representing at least one application state of said local application based on at least one manipulation of said design using said local application;

communicating said at least one application state file from said session client process to said other session client processes via said session manager;

receiving a first application state file created by another user on another local application and communicated from one of said other session clients via said session manager;

presenting the first application state file created by another user on another local application to a user of the session client process to allow the user to refuse or delay loading of the first application state file; and if the user applies to delay loading of the first application state file:

buffering the first application state file at the application layer to allow the user to incorporate the buffered first application state file into the design data at a later user-determined time; and loading the first application state file created by the other users on the other local applications at a time determined by the user of the session client process;

wherein the buffering of incoming application state files enables the user of the client process to selectively apply other users' changes to the design, thereby allowing the user of the session client process to manipulate a first aspect of the design before loading changes made to a second aspect of the design by the other users within the other users' respective local applications.

2. The method of claim 1 wherein said at least one application state is encoded using normalized XML structures to create said at least one application state file, and wherein said at least one application state file is communicated as an XML message.

3. The method of claim 2 wherein said XML structures are based on domain specific conventions defined in the context of the type of design data.

4. The method of claim 1 further comprising saving said session controls and said at least one application state file in a journal file.

5. The method of claim 1 further comprising the step of scheduling said collaborative session.

6. The method of claim 1 further comprising the step of conducting a text-based conversation with said other session clients.

7. The method of claim 1 further comprising the steps of logging in to said collaborative session and logging out of said collaborative session.

8. The method of claim 1 further comprising the step of displaying design manipulations corresponding to said application state file created and communicated by said other application files.

9. The method of claim 1 wherein said design is manipulated without having to transmit design images between said heterogeneous applications.

10. A computerized method for providing asynchronous training to a user to manipulate a design representing electrical or mechanical assemblies using a plurality of heterogeneous applications, said method comprising the steps of:

loading design data into a local application on a computer;

manipulating a design based on said design data using said local application;

creating at least one application state file representing an application state of said local application based on at least one manipulation of said design using said local application;

saving each said at least one application state file in a journal file; and transmitting said journal file to another computer such that said at least one application state file can be loaded on said another computer and said at least one application state file can be presented to the user to allow the user to refuse or delay review of said at least one application state file using another heterogeneous application running on said another computer, wherein said journal file provides interactive instructions when played back on said another computer; and if the user chooses to delay loading of said at least one application state file:

buffering said at least one application state file at the application layer to allow the user to incorporate the buffered first application state file into the design data at a later user-determined time; and loading said at least one application state file at a time determined by the user;

wherein the buffering of application state files enables the user to selectively apply other changes to the design, thereby allowing the user to manipulate a first aspect of the design before loading changes made to a second aspect of the design and providing asynchronous training to the user.

11. The computerized method of claim 10 wherein said method is an asynchronous method of collaboration.

12. A computer program product comprising a storage medium having computer-readable code stored thereon synchronization of a plurality of heterogeneous user applications running on respective clients for collaborating over a network via a session manager to manipulate a design manipulated by a plurality of users representing electrical or mechanical assemblies, said system comprising:

at least one application state file for representing application states created by a local application based on at least one manipulation of a design made using said local application; and a session client module for synchronizing interaction between said local application and a collaborative session and for communicating said application state file over the network to other clients and receiving at least one other application state file created by other users from the other clients, presenting the at least one other application state file to a user of the computer program product to allow the user to refuse or delay loading of the at least one other application state file, and if the user chooses to delay loading of the at least one other application state file:

buffering the at least one application state file at the application layer to allow the user to delay the user to incorporate the at least one application state file into the design data at a later user-determined time;

loading the at least one application state file created by the other users on the other clients at a time determined by the user of the computer program product;

wherein the buffering of incoming application state files enables the user of the computer program product to selectively apply other users' changes to the design, thereby allowing the user of the computer program product to manipulate a first aspect of the design before loading changes made to a second aspect of the design by the other users within the other user's respective local computer program products.

13. The computer program product of claim 12 wherein said session client module comprises:

a user interface for interfacing with a user;

a first application programming interface for interfacing with said local application; and a second application programming interface for interfacing with a session manager over the network.

14. The computer program product of claim 12 further comprising a session journal for recording session controls and said application states during said collaboration session.

15. The computer program product of claim 12 wherein said application states are encoded using normalized XML structures to create said at least one application state file, and wherein said at least one application state file is communicated as an XML message.

16. The computer program product of claim 12 wherein said session client module communicates said application state file without sending images of said design.

17. A computer program product comprising a storage medium having computer-readable code stored thereon for providing asynchronous training to a user to manipulate a design representing electrical or mechanical assemblies using a plurality of heterogeneous applications, said system comprising:
    means for loading design data into a local application on a computer;
    means for manipulating a design based on said design data using said local application;
    creating at least one application state file representing an application state of said local application based on at least one manipulation of said design using said local application;
    means for saving each said at least one application state file in a journal file; and
    means for transmitting said journal file to another computer such that said at least one application state file can be loaded on said another computer and said at least one application state file can be presented to the user to allow the user to refuse or delay review of said at least one application state file using another heterogeneous application running on said another computer, wherein said journal file provides interactive instructions when played back on said another computer, and if the user chooses to delay loading said at least one application state file:
        buffering said at least one application state file at the application layer to allow the user to incorporate the buffered first application state file into the design data at a later user-determined time; and
        loading said at least one application state file at a time determined by the user;
    wherein the buffering of application state files enables the user to selectively apply other changes to the design, thereby allowing the user to manipulate a first aspect of the design before loading changes made to a second aspect of the design and providing asynchronous training to the user.

18. A computer program product comprising a storage medium having computer-readable code stored thereon for synchronization of a plurality of heterogeneous user applications running on respective clients collaborating over a network via a session manager to manipulate a design manipulated by a plurality of users representing electrical or mechanical assemblies, said computer-readable code comprising:
    code for interfacing with a user;
    code for interfacing with a local application used to manipulate a design;
    code for interfacing with a session manager over a network;
    code for creating a session client process to communicate session controls and at least one application state file to said session manager over said network, wherein said application state file is created by said local application based on at least one manipulation of said design; and
    code for receiving at least one other application state file created by another user on other local applications from said session manager over said network, presenting the at least one other application state file created by other users on another local application to the user to allow the user to refuse or delay loading of the first application state file, and if the user chooses to delay loading of the at least one other application state file:
        buffering the at least one application state file at the application layer to allow the user to incorporate the buffered first application state file into the design data at a later user-determined time; and
        loading the at least one other application state file created by the other users on the other local applications at a time determined by the user of the session client process,
    wherein the buffering of incoming application state files enables the user of the client process to selectively apply other users' changes to the design, thereby allowing the user of the session client process to manipulate a first aspect of the design before loading changes made to a second aspect of the design by the other users within the other users' respective local applications.

19. A computer program product comprising a storage medium having computer-readable code stored thereon for synchronization of a plurality of heterogeneous user applications running on respective clients collaborating over a network via session manager to manipulate a design manipulated by a plurality of users representing electrical or mechanical assemblies, said computer-readable code comprising:
    code for interfacing with a user;
    code for interfacing with a local application;
    code for instructing said local application to create at least one application state file representing at least one application state based on a manipulation made to a design using said application state file;
    code for interfacing with a session manager over a network;
    code for sending said at least one application state file and session controls to said session manager; and
    code for notifying said local application that at least one other application state file created by other users on other local applications has been received, presenting the at least one other application state file created by other users on other local application to the user to allow the user to refuse or delay loading of the first application state file, and if the user chooses to delay loading of the at least one other application state file:
        buffering the at least one application state file at the application layer to allow the user to incorporate the buffered first application state file into the design data at a later user-determined time; and
        loading the at least one other application state files created by the other users on the other local applications at a time determined by the user;
    wherein the buffering of incoming application state files enables the user to selectively apply other users' changes to the design, thereby allowing the user to manipulate a first aspect of the design before loading changes made to a second aspect of the design by the other users within the other user's respective local applications.

20. The computer program product of claim 19 further comprising code for controlling instantiation of said received application state file into said local application.

21. A computerized method for synchronization of a plurality of heterogeneous user applications running on respective clients collaborating over a network via a session manager to manipulate a design manipulated by a plurality of users representing electrical or mechanical assemblies, said method comprising the steps of:

connecting a session client process to a session manager over the network to participate in a collaborative session;

sharing session control messages with other session client processes connected to said session manager;

loading design data representing said design into a local application running on said client;

creating at least one local application state event representing at least one application state of said local application based on at least one manipulation of said design using said local application; and communicating said at least one local application state event from said session client process to said other session client processes via said session manager;

receiving at least one other application state file created by other users on other local applications and communicated from said other session clients via said session manager;

presenting the at least one other application state file created by another user on another local application to a user of the session client process to allow the user to refuse or delay loading of the at least one other application state file; and if the user chooses to delay loading of the at least one other application state file:

buffering the at least one application state file at the application layer to allow the user to incorporate the buffered at least one other application state file into the design data at a later user-determined time; and loading the at least one other application state file created by the other users on the other local applications at a time determined by the user of the session client process;

wherein the buffering of incoming application state file enables the user to selectively apply other users' changes to the design, thereby allowing the user to manipulate a first aspect of the design before loading changes made to a second aspect of the design by the other users within the other users' respective local applications.

22. The method of claim 21 wherein the step of communicating further comprises:

communicating said at least one local application state event as at least one data packet for representing said at least one application state event.

23. The method of claim 21 wherein the at least one local application state event is at least one of a plurality of normalized application state events recognized by each of the heterogeneous user applications.

24. The method of claim 21 further comprising the step of:

saving said session control messages and said at least one local application state event in a journal file.

* * * * *

UNITED STATES PATENT AND TRADEMARK OFFICE
CERTIFICATE OF CORRECTION

PATENT NO. : 7,661,101 B2
APPLICATION NO. : 10/757975
DATED : February 9, 2010
INVENTOR(S) : Pawel Z. Chadzynski It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 887 days.

Signed and Sealed this

Fourteenth Day of September, 2010

David J. Kappos
*Director of the United States Patent and Trademark Office*